United States Patent
Kalantari et al.

(10) Patent No.: US 11,094,043 B2
(45) Date of Patent: Aug. 17, 2021

(54) GENERATION OF HIGH DYNAMIC RANGE VISUAL MEDIA

(71) Applicant: The Regents of the University of California, Oakland, CA (US)

(72) Inventors: Nima Khademi Kalantari, San Diego, CA (US); Ravi Ramamoorthi, Carlsbad, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 55 days.

(21) Appl. No.: 16/141,843

(22) Filed: Sep. 25, 2018

(65) Prior Publication Data

US 2019/0096046 A1    Mar. 28, 2019

Related U.S. Application Data

(60) Provisional application No. 62/562,922, filed on Sep. 25, 2017.

(51) Int. Cl.
*G06T 5/00* (2006.01)
*G06T 7/33* (2017.01)
(Continued)

(52) U.S. Cl.
CPC .............. *G06T 5/009* (2013.01); *G06N 3/084* (2013.01); *G06T 5/008* (2013.01); *G06T 5/50* (2013.01);
(Continued)

(58) Field of Classification Search
CPC . G06T 2207/20208; G06T 2207/10016; G06T 5/009; G06T 5/50; G06T 5/008;
(Continued)

(56) References Cited

U.S. PATENT DOCUMENTS

| 2014/0168468 A1* | 6/2014 | Levoy | G06K 9/6212 |
| | | | 348/229.1 |
| 2016/0259994 A1* | 9/2016 | Ravindran | G06N 3/08 |

(Continued)

OTHER PUBLICATIONS

Tursun, O.T. et al., The State of the Art in HDR Deghosting: A Survey and Evaluation. CGF 34,2 (2015).
(Continued)

*Primary Examiner* — Marcos L Torres
(74) *Attorney, Agent, or Firm* — Perkins Coie LLP

(57) ABSTRACT

Devices, systems and methods for generating high dynamic range images and video from a set of low dynamic range images and video using convolution neural networks (CNNs) are described. One exemplary method for generating high dynamic range visual media includes generating, using a first CNN to merge a first set of images having a first dynamic range, a final image having a second dynamic range that is greater than the first dynamic range. Another exemplary method for generating training data includes generating sets of static and dynamic images having a first dynamic range, generating, based on a weighted sum of the set of static images, a set of ground truth images having a second dynamic range greater than the first dynamic range, and replacing at least one of the set of dynamic images with an image from the set of static images to generate a set of training images.

17 Claims, 12 Drawing Sheets

(51) Int. Cl.
*G06N 3/08* (2006.01)
*G06T 5/50* (2006.01)
(52) U.S. Cl.
CPC .... *G06T 7/337* (2017.01); *G06T 2207/10016* (2013.01); *G06T 2207/20208* (2013.01)
(58) Field of Classification Search
CPC .......... G06T 7/337; G06T 2207/20084; G06N 3/0454; G06N 3/084
See application file for complete search history.

(56) References Cited

U.S. PATENT DOCUMENTS

2018/0121767 A1* 5/2018 Wang ........................ G06N 3/04
2020/0134787 A1* 4/2020 Bouzaraa ................. G06T 5/003

OTHER PUBLICATIONS

Vedaldi, A. et al., 2015. MatConvNet: Convolutional neural networks forMatlab. In ACMMM. 689-692.
Ward, G., Fast, Robust Image Registration for Compositing High Dynamic Range Photographs from Hand-Held Exposures. Journal of Graphics, GPU, and Game Tools 8, 2 (2003), 17-30.
Zhang, L. et al., 2010. Denoising vs. deblurring: HDR imagingtechniques using moving cameras. In CVPR. 522-529.
Zhang, W. et al., Gradient-Directed Multiexposure Composition. IEEE TIP 21,4 (Apr. 2012), 2318-2323.
Zhao, H. et al., 2015. Unbounded High Dynamic Range Photography Using a Modulo Camera. In ICCP 2015. 1-10.
Zheng, J. et al., Hybrid Patching for a Sequence of Differently Exposed Images With Moving Objects. IEEE TIP 22, (Dec. 12, 2013), 5190-5201.
Zimmer, H. et al., . Freehand HDR Imaging of Moving Scenes with Simultaneous Resolution Enhancement. CGF 30, (Apr. 2, 2011), 405-414.
Badki, A. et al., "Robust Radiometric Calibration for Dynamic Scenes in the Wild", IEEE ICCP, 2015, pp. 1-10.
Bogoni, L., Extending Dynamic Range of Monochrome and Color Imagesthrough Fusion. In IEEE ICPR. 3007-3016, 2000.
Chen et al., 2013. Large Displacement Optical Flowfrom Nearest Neighbor Fields. In IEEE CVPR. 2443-2450.
Cheng, Z. et al., 2015. Deep Colorization. In IEEE ICCV. 415-423.
Debevec, P. et al., 1997, Recovering high dynamic range radiance maps from photographs, in AMC SIGGGRAPH, 269-378.
Dosovitskiy, A. et al., FlowNet: Learning Optical Flow with Convolutional Networks. In ICCV. 2758-2766.
Flynn, J. et al., 2016, DeepStereo: Learning to Predict New Views from the WorldâĂŹs Imagery. In IEEE CVPR. 5515-5524.
Froehlich, J. et al., 2014, Creating cinematic wide gamut HDR-video for the evaluation of tone mapping operators and HDR-displays. SPIE 9023 (2014), 90230X-90230X-10.
Funt, B. et al., The Rehabilitation of MaxRGB. Color and Imaging Conference 2010,1 (2010), 256-259.
Gallo, O. et al., 2009. Artifact-free High Dynamic Range Imaging. In IEEE ICCP. 1-7.
Gallo, O. et al., 2015. Locally non-rigid registration for mobile HDR photography. In IEEE CVPRW. 48-55.
Glorot, X. et al., 2010. Understanding the difficulty of training deep feedforward neural networks. In AISTATS, vol. 9, 249-256.
Goodfellow, I.J., et al., 2014. Generative Adversarial Networks. ArXiv e-prints (Jun. 2014). arXiv:stat. ML/1406.2661.
Granados, M. et al., 2010, Optimal HDR reconstruction with linear digital cameras. In IEEE CVPR. 215-222.
Granados, M. et al., 2013, Automatic Noise Modeling for Ghost-free HDR Reconstruction. ACM TOG 32, 6, Article 201 (2013), 10 pages.
Grosch, T., 2006. Fast and Robust High Dynamic Range Image Generation with Camera and Object Movement. In Vision, Modeling and Visualization. 277-284.

Grossberg, M.D. et al., 2003. Determining the Camera Response from Images: What is Knowable? IEEE PAMI 25, 11 (Nov. 2003), 1455-1467.
Hacohen, Y. et al., 2011, Non-rigid dense correspondence with applications for image enhancement. ACM TOG 30, 4, Article 70 (2011), 10 pages.
Hajisharif, S. et al., 2015. Adaptive dualISO HDR reconstruction. EURASIP Journal on Image and Video Processing 2015, 1 (2015), 41.
Hasinoff, S.W. et al., 2010, Noise-optimal capture for high dynamic range photography, in CVPR, 553-560.
Hasinoff, S.W. et al., 2016, Burst Photography for High Dynamic Range and Low-light Imaging on Mobile Cameras. ACM TOG 35, 6, Article 192 (Nov. 2016), 12 pages.
Heide, F. et al., FlexISP: A Flexible Camera Image Processing Framework, ACM TOG 33, 6, Article 231 (Nov. 2014), 13 pages.
Heo, Y.S. et al., 2010. Ghost-free high dynamic range imaging. In ACCV, vol. 4. 486-500.
Hu, J. et al., 2013. HDR Deghosting: How to Deal with Saturation?. In IEEE CVPR. 1163-1170.
Iizuka, S. et al., 2016, Let There Be Color!: Joint End-to-end Learning of Global and Local Image Priors for Automatic Image Colorization with Simultaneous Classification. ACM TOG 35, 4, Article 110 (Jul. 2016), 11 pages.
Ilg, E. et al., 2016. FlowNet 2.0: Evolution of Optical Flow Estimation with Deep Networks. CoRR abs/1612.01925 (2016).
Jacobs, K. et al., 2008. Automatic High-Dynamic Range Image Generation for Dynamic Scenes. IEEE Computer Graphics and Applications 28, 2 (Mar.-Apr. 2008), 84-93.
Jinno, T.et al., 2008. Motion blur free HDR image acquisition using multiple exposures. In IEEE ICIP. 1304-1307.
Kalantari, N.K. et al., "Deep High Dynamic Range Imaging of Dynamic Scenes", ACM Transactions on Graphics, vol. 36, No. 4, article 144, Jul. 2017.
Kalantari, N.K. et al., 2016, Learning-based View Synthesis for Light Field Cameras. ACM TOG 35, 6, Article 193 (Nov. 2016), 10 pages.
Kang, S.B. et al., 2003. High dynamic range video. ACM TOG 22, 3 (2003), 319-325.
Karaduzovic-Hadziabdic, K. et al., 2016, Subjective and Objective Evaluation of Multi-exposure High Dynamic Range Im-age Deghosting Methods. In EG, T. Bashford-Rogers and L P. Santos (Eds.). The Eurographics Association. https://doi.org/10.2312/egsh.20161007.
Khan, E.A. et al., 2006. Ghost Removal in High Dynamic Range Images. In IEEE ICIP. 2005-2008.
Lee, C. et al., 2014. Ghost-Free High Dynamic Range Imaging via Rank Minimization. IEEE SPL 21, 9 (Sep. 2014), 1045-1049.
Li, Z. et al., 2014. Selectively Detail-Enhanced Fusion of Differently Exposed Images With Moving Objects. IEEE Transactions on Image Processing 23, 10 (Oct. 2014), 4372-4382.
Liu, C., 2009, Beyond Pixels: Exploring New Representations and Applications for Motion Analysis. Doctoral thesis. Massachusetts Institute of Technology.
Lucas, B. et al., 1981. An Iterative Image Registration Techniquewith an Application to Stereo Vision. In IJCAI. 674-679.
Mann, S. et al., 1995, On Being "undigital" With Cameras: Extending Dynamic Range by Combining Differently Exposed Pictures. In Proc. of Society for Imaging Science and Technology. 442-448.
Mantiuk, R. et al., 2011, HDR-VDP-2: A Calibrated Visual Metric for Visibility and Quality Predictions in All Luminance Conditions. ACM TOG 30, 4, Article 40 (Jul. 2011), 14 pages.
McGuire, M. et al., 2007, Optical Splitting Trees for High-Precision Monocular Imaging. IEEE Computer Graphics and Applications 27, 2 (Mar.-Apr. 2007), 32-42.
Mildenhall, B. et al., "Burst Denoising with Kernel Prediction Networks", arXiv:1712.02327v2, Mar. 29, 2018.
Oh, T.H. et al., . 2015. Robust High Dynamic Range Imaging by Rank Minimization. IEEE PAMI 37, 6 (2015), 1219-1232.
Pece, F. et al., 2010. Bitmap Movement Detection: HDR for Dynamic Scenes. In CVMP. 1-8.
Photomatix, 2017, Commercially-available HDR processing software, 2017, http://www.hdrsoft.com.

(56) References Cited

OTHER PUBLICATIONS

Raman, S. et al., 2011, Reconstruction of high contrast images for dynamic scenes, The Visual Computer 27, 12, 2011, 1099-1114.
Rumelhart, D. et al., 1986, Learning Representations by Back-propagating Errors, Nature 323, 1986, 533-536.
Sen, P. et al., Robust patch-based HDR reconstruction of dynamic scenes. ACM TOG 31, 6, article 203, 2012, 11 pages.
Serrano, A. et al., Convolutional Sparse Coding for High Dynamic Range Imaging. CGF 35, 2 (2016), 153-163.
Tocci, M.D. et al., A versatile HDR video production system, ACM TOG 30, 4, article 41, 2011, 10 pages.
Tomaszewska, A. et al., Image Registration for Multi-exposure High Dynamic Range Image Acquisition, in WSCG.
Godard, C. et al. "Deep Burst Denoising" asXiv:1712.05790v1 [cs.CV] Dec. 15, 2017. 10 pages.
Hu, J. et al. "Exposure Stacks of Live Scenes with Hand-Held Cameras" Springer Berlin Heidelberg, Berlin, Heidelberg, (2012), 499-512.
Tursun, O. et al. "An Objective Deghosting Quality Metric for HDR Images" CGF 35, 2 (2016), 139-152.

\* cited by examiner

Generating, using a first convolutional neural network (CNN) to merge a first set of images having a first dynamic range, a final image having a second dynamic range that is greater than the first dynamic range — 1010

FIG. 10

Generating a set of static images having a first dynamic range — 1110

Generating, based on a weighted sum of the set of static images, a set of ground truth images having a second dynamic range greater than the first dynamic range — 1120

Generating a set of dynamic images having the first dynamic range — 1130

Replacing at least one of the set of dynamic images with an image from the set of static images to generate a set of training images — 1140

FIG. 11

GENERATION OF HIGH DYNAMIC RANGE VISUAL MEDIA

CROSS REFERENCE TO RELATED APPLICATIONS

This patent document claims the benefit of priority of U.S. Provisional Patent Application No. 62/562,922 entitled "HIGH DYNAMIC RANGE IMAGING OF MOVING SCENES" and filed on Sep. 25, 2017. The entire content of the before-mentioned patent application is incorporated by reference as part of the disclosure of this patent document.

STATEMENT REGARDING FEDERALLY SPONSORED RESEARCH OR DEVELOPMENT

This invention was made with government support under Grant No. 1617234 awarded by the National Research Foundation and Grant No. N000141512013 awarded by the Office of Naval Research. The government has certain rights in the invention.

TECHNICAL FIELD

This patent document relates to image processing, and more particularly, the generation of high dynamic range images and video.

BACKGROUND

Recent developments in the image capture and processing technologies have made it possible to produce digital still pictures that increase the contrast or dynamic range of the image using image post-processing techniques. These images, sometimes called high dynamic range (HDR) images, have found commercial success and are often implemented in many consumer electronics products such as smartphones and tablets.

SUMMARY

Disclosed are devices, systems and methods for generating HDR images and video from a set of low dynamic range (LDR) images and video using convolution neural networks (CNNs). In an example, this may be achieved by aligning the LDR images, and merging the aligned LDR images using a CNN to generate the final HDR image.

In one exemplary aspect, the disclosed technology may be used to provide a method for generating HDR visual media. This method includes generating, using a first convolutional neural network (CNN) to merge a first set of images having a first dynamic range, a final image having a second dynamic range that is greater than the first dynamic range.

In another exemplary aspect, the disclosed technology may be used to provide a method for generating training data. This method includes generating a set of static images having a first dynamic range, generating, based on a weighted sum of the set of static images, a set of ground truth images having a second dynamic range greater than the first dynamic range, generating a set of dynamic images having the first dynamic range, and replacing at least one of the set of dynamic images with an image from the set of static images to generate a set of training images.

In yet another exemplary aspect, the above-described methods are embodied in the form of processor-executable code and stored in a computer-readable program medium.

In yet another exemplary aspect, a device that is configured or operable to perform the above-described methods is disclosed.

The above and other aspects and features of the disclosed technology are described in greater detail in the drawings, the description and the claims.

BRIEF DESCRIPTION OF THE DRAWINGS

FIG. 10 shows a flowchart of an example method for generating HDR images from a set of LDR images.

FIG. 11 shows a flowchart of an example method for generating training data, based on embodiments of the disclosed technology.

DETAILED DESCRIPTION

Producing high dynamic range (HDR) images from a set of images with different exposures, or an HDR video from a sequence with alternating exposures and reconstructing the missing content in each frame, is a challenging process for dynamic scenes. Some existing implementations first register the input images to a reference image and then merge the aligned images into n HDR image. However, the artifacts of the registration usually appear as ghosting and tearing in the final HDR images. Similarly, existing techniques that use off-the-shelf cameras to produce an HDR video are typically slow and produce imperfect results.

Some embodiments of the disclosed technology include a learning-based approach to produce HDR images for dynamic scenes. An exemplary method includes using a convolutional neural network (CNN) as a learning model with different system architectures to model the HDR merge process. Furthermore, a large dataset of input LDR images and their corresponding ground truth HDR images are created to train the system.

Some embodiments of the disclosed technology produce HDR video using two sequential CNNs to model the entire HDR video reconstruction process. In a first step, the neighboring frames are aligned to the current frame by estimating the flows between them using a network. Then, the aligned and current images are combined using another CNN to produce the final HDR frame. End-to-end training is performed by minimizing the error between the reconstructed and ground truth HDR images on a set of training scenes, which are produced synthetically from existing HDR video datasets.

Section headings are used in the present document to improve readability of the description and do not in any way limit the discussion or the embodiments (and/or implementations) to the respective sections only.

1 Exemplary Embodiments for Generating HDR Images

1.1 Overview

In some embodiments, and given a set of three LDR images of a dynamic scene ($Z_1$, $Z_2$, $Z_3$), the disclosed technology may be used to generate a ghost-free HDR image, H, which is aligned to the medium exposure image $Z_2$ (reference). This process can be broken down into two stages of 1) alignment and 2) HDR merge. During alignment, the LDR images with low and high exposures, defined with $Z_1$ and $Z_3$, respectively, are registered to the reference image, denoted as $Z_2$. This process produces a set of aligned images, $\mathcal{I} = \{I_1, I_2, I_3\}$, where $I_2 = Z_2$. These aligned images are then combined in the HDR merge stage to produce an HDR image, H.

The disclosed technology relies on, amongst other properties and features, the fact that the alignment artifacts from the first stage can be significantly reduced through the HDR merge in the second stage. In an example, this may be achieved by using a convolutional neural network (CNN) to model the HDR merge process.

Figure 1:
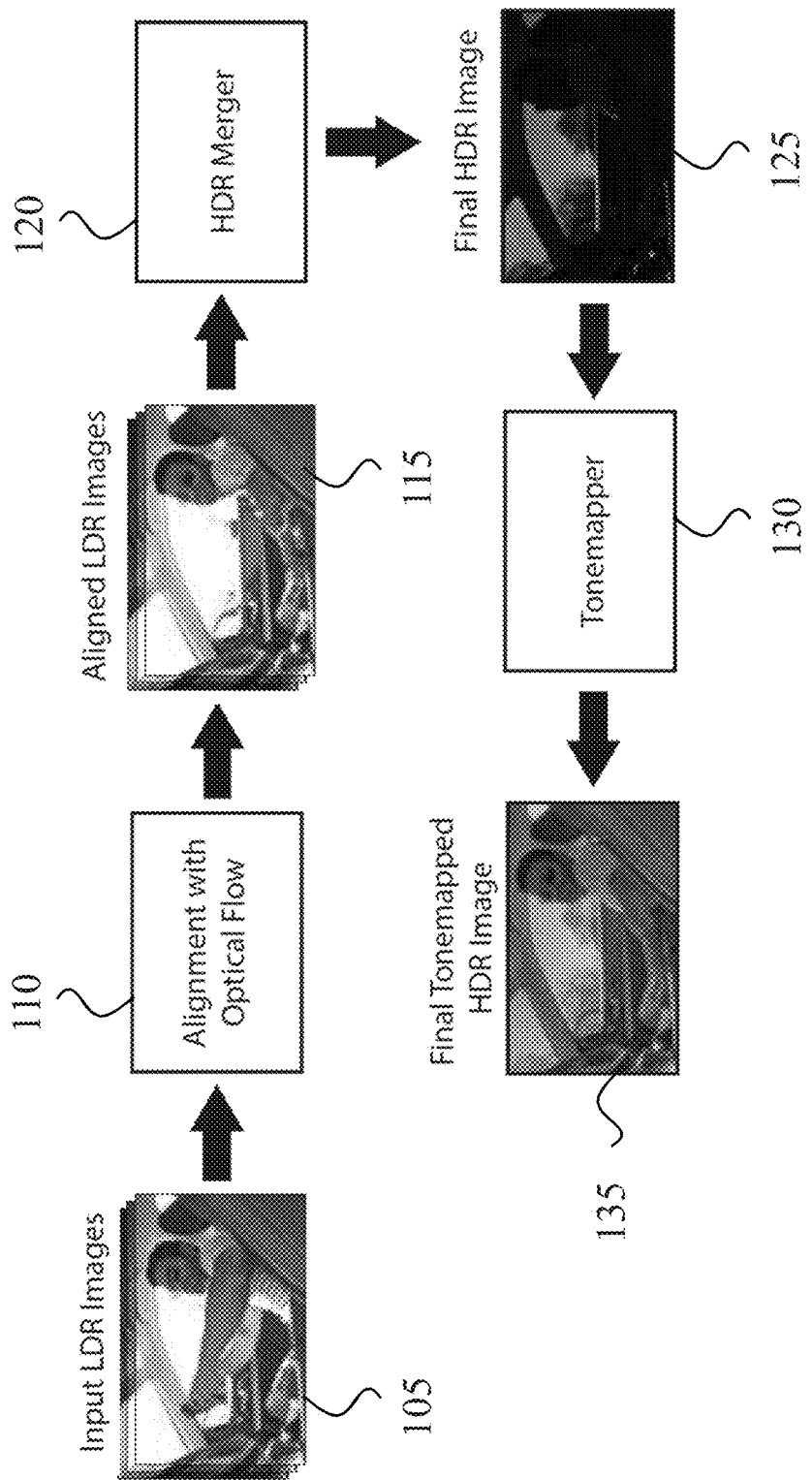
FIG. 1 shows an exemplary flowchart for generating a high dynamic range (HDR) image based on input low dynamic range (LDR) images.

FIG. 1 shows an exemplary approach for generating HDR images based on LDR images of a dynamic scene, and includes the following stages:

Preprocessing the Input LDR Images.

In some embodiments, if the input LDR images (105) are not in the RAW format, they may be first linearized using the camera response function (CRF), which can be obtained from the input stack of images using advanced calibration approaches. Then gamma correction ($\gamma=2.2$) is applied on these linearized images to produce the input images to the system, ($Z_1$, $Z_2$, $Z_3$). The gamma correction basically maps the images into a domain that is closer to what is perceived with our eyes. Note that, this process replaces the original CRF with the gamma curve which is used to map images from LDR to the HDR domain and vice versa.

Alignment.

Next, in step 110, aligned images are produced by registering the images with low ($Z_1$) and high ($Z_3$) exposures to the reference image, $Z_2$. For simplicity, the process of registering $Z_3$ to $Z_2$ is described, and $Z_1$ can be aligned to $Z_2$ in a similar manner. Since optical flow methods require brightness constancy to perform well, the exposure of the darker image is raised to that of the brighter one. In this case, the exposure of $Z_2$ is raised to match that of $Z_3$ to obtain the exposure corrected image. Formally, this is obtained as $Z_{2,3} = \text{clip}(Z_2 \Delta_{2,3}^{1/\gamma})$, where the clipping function ensures the output is always in the range [0, 1]. Moreover, $\Delta_{2,3}$ is the exposure ratio of these two images, $\Delta_{2,3} = t_3/t_2$, where $t_2$ and $t_3$ are the exposure times of the reference and high exposure images.

Then the flow between $Z_3$ and $Z_{2,3}$ is computed using an optical flow algorithm, and finally, bicubic interpolation is used to warp the high exposure image $Z_3$ using the calculated flow. This process produces a set of aligned images $\mathcal{I} = \{I_1, I_2, I_3\}$ (115) which are then used as the input to the learning-based HDR merge component (120) to produce the final HDR image, H (125).

HDR Merge.

This component is directed to detect the alignment artifacts and avoid their contribution to the final HDR image. In some embodiments, machine learning may be used to model this complex task. Therefore, two main issues may be addressed: the choice of 1) model, and 2) loss function.

1) Model:

Convolutional neural networks (CNNs) may be used as the learning model in conjunction with three different system architectures to model the HDR merge process.

2) Loss Function:

Since HDR images are usually displayed after tonemapping, the loss function is computed between the tonemapped estimated and ground truth HDR images. In some embodiments, gamma encoding, defined as $H^{1/\gamma}$ with $\gamma>1$ (and which is not differentiable around zero), is one possible way of tonemapping in image processing. In other embodiments, the μ-law, which a commonly-used range compressor in audio processing (and which is differentiable around zero), may be used. This function is defined as:

$$T = \frac{\log(1 + \mu H)}{\log(1 + \mu)}. \quad (1)$$

Herein, μ is a parameter which defines the amount of compression, H is the HDR image in the linear domain, and T is the tonemapped image. In some embodiments, H may be in the range [0, 1], μ may be set to 5000, and the learning system is trained by minimizing the $l^2$ distance of the tonemapped estimated and ground truth HDR images, which is defined as:

$$E = \Sigma_{k=1}^{3}(\hat{T}_k - T_k)^2. \quad (2)$$

Herein, $\hat{T}$ and T are the estimated and ground truth tonemapped HDR images and the summation is over color channels.

In some embodiments, the system may be trained by computing the error in Eq. (2) directly on the estimated (Â) and ground truth (H) HDR images in the linear domain. Although this system produces HDR images with small error in the linear HDR domain, the estimated images typically demonstrate discoloration, noise, and other artifacts after tonemapping.

1.2 Embodiments of Learning-Based HDR Merge

In some embodiments, the goal of the HDR merge process is to take the aligned LDR images, $I_1$, $I_2$, $I_3$, as input and produce a high-quality HDR image, H. Intuitively, this process requires estimating the quality of the input aligned HDR images and combining them based on their quality. For example, an image should not contribute to the final HDR result in the regions with alignment artifacts, noise, or saturation.

In some embodiments, the aligned images in both the LDR and HDR domains are needed to measure their quality. The images in the LDR domain are required to detect the noisy or saturated regions. For example, a simple rule would be to consider all the pixels that are smaller than 0.1 and larger than 0.9, noisy and saturated, respectively. Moreover, the images in the HDR domain could be helpful for detecting misalignments by, for example, measuring the amount of deviation from the reference image.

In some embodiments, the HDR merge process can be formally written as:

$$H = g(\mathcal{I}, \mathcal{H}). \quad (3)$$

Herein, g is a function which defines the relationship of the HDR image, H, to the inputs, and $\mathcal{H}$ is the set of aligned images in the HDR domain, $H_1$, $H_2$, $H_3$. In some embodiments, these are obtained from the aligned LDR images, $I_i$, as: $H_i = I_i^\gamma / t_i$, where $t_i$ is the exposure time of the $i^{th}$ image. In an example, and during the preprocessing step, a gamma curve may be used to map the images from linear HDR domain to the LDR domain, and thus, the LDR images may be raised to the power of gamma to take them to the HDR domain.

1.3 Exemplary Architectures for HDR Merge

The first and simplest architecture (direct) models the entire process with a single CNN. Then, knowledge from the existing HDR merge techniques may be used to constrain the problem in the weight estimator (WE) architecture by using the network to only estimate a set of blending weights. Finally, in the weight and image estimator (WIE) architecture, some of the constraints of the WE architecture are relaxed by using the network to output a set of refined aligned LDR images in addition to the blending weights. Overall, the three architectures produce high-quality results, but have small differences which are discussed later in the present document.

Figure 2A:
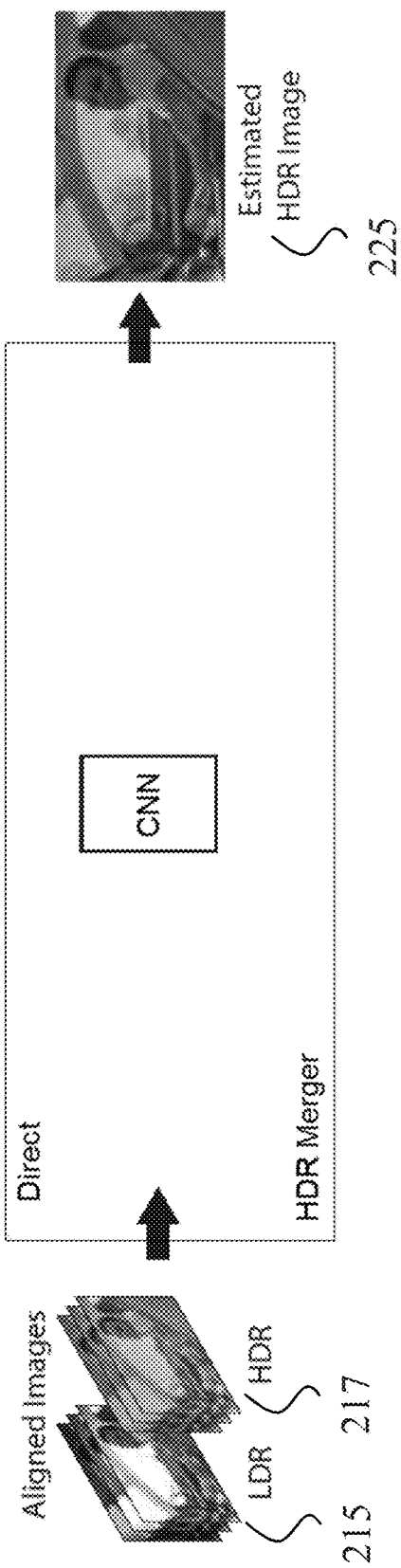
FIGS. 2A-2C show different exemplary architectures for the HDR merge process.

1) Direct:

In this architecture, the entire HDR merge process is modeled using a CNN, as shown in FIG. 2A. In this case, the CNN directly parametrizes the function g in terms of its weights. The CNN takes a stack of aligned images in the LDR and HDR domains as input, $\{\mathcal{I}, \mathcal{H}\}$ and outputs the final HDR image, H.

In some embodiments, the estimated HDR image is then tonemapped using Eq. (1) to produce the final tonemapped HDR image. The goal of training is to find the optimal network weights, w, by minimizing the error between the estimated and ground truth tonemapped HDR images, defined in Eq. (2). In order to use gradient descent based techniques to train the system, the derivative of the error with respect to the network weights is computed. To do so, the chain rule is used to break down this derivative into three terms as:

$$\frac{\partial E}{\partial w} = \frac{\partial E}{\partial \hat{T}} \frac{\partial \hat{T}}{\partial \hat{H}} \frac{\partial \hat{H}}{\partial w}. \tag{4}$$

The first term is the derivative of the error function in Eq. (2) with respect to the estimated tonemapped image. Since the error is quadratic, this derivative may be easily computed. The second term is the derivative of the tonemapping function, defined in Eq. (1), with respect to its input. Since the µ-law function is used as the tonemapping function, this derivative can be computed as:

$$\frac{\partial \hat{T}}{\partial \hat{H}} = \frac{\mu}{\log(1+\mu)} \frac{1}{1+\mu \hat{H}}. \tag{5}$$

Finally, the last term is the derivative of the network output with respect to its weights which can be calculated using backpropagation.

Overall, the CNN in this simple architecture models the entire complex HDR merge process, and thus, training the network with a limited number of scenes may be problematic. Although this architecture is able to produce high-quality results, in some cases it leaves residual alignment artifacts in the final HDR images.

2) Weight Estimator (WE):

In some embodiments, this architecture typically computes a weighted average of the aligned HDR images to produce the final HDR result:

$$\hat{H}(p) = \frac{\sum_{j=1}^{3} \alpha_j(p) H_j(p)}{\sum_{j=1}^{3} \alpha_j(p)}, \text{ where } H_j(p) = \frac{I_j^\gamma}{t_j}. \tag{6}$$

Here, the weight $\alpha_j(p)$ basically defines the quality of the $j^{th}$ aligned image at pixel p and needs to be estimated from the input data. Existing implementations of HDR merging approaches calculate these weights by, for example, the derivative of inverse CRF, a triangle function, or modeling the camera noise. Unfortunately, these methods assume that the images are perfectly aligned and do not work well on dynamic scenes.

In contrast, embodiments of the disclosed technology learn the weight estimation process using a CNN. In this case, the CNN takes the aligned LDR and HDR images as input, $\{\mathcal{I}, \mathcal{H}\}$, and outputs the blending weights, $\alpha$. Then, a weighted average of the aligned HDR images is computed using these estimated weights (see Eq. (6)) to produce the final HDR image.

In some embodiments, and to train the network in this architecture (shown in FIG. 2B), the derivative of the error with respect to the network's weights must be computed. The chain rule may be used to break down this derivative into four terms as:

$$\frac{\partial E}{\partial w} = \frac{\partial E}{\partial \hat{T}} \frac{\partial \hat{T}}{\partial \hat{H}} \frac{\partial \hat{H}}{\partial \alpha} \frac{\partial \alpha}{\partial w}. \tag{7}$$

Note that, the last term is basically the derivative of the network's output with respect to its weights and can be calculated using backpropagation. Here, the only difference with respect to Eq. (4) is the third term. This term, $\partial \hat{H}/\partial \alpha$, is the derivative of the estimated HDR image with respect to the blending weights, $\alpha_1$, $\alpha_2$, $\alpha_3$. Since the estimated HDR image in this case is obtained using Eq. (6), this derivative may be computed as:

$$\frac{\partial \hat{H}}{\partial \alpha_i} = \frac{H_i(p) - \hat{H}(p)}{\sum_{j=1}^{3} \alpha_j(p)}. \tag{8}$$

Although this architecture is more constrained than the direct architecture, it is easier to train. Therefore, it produces high-quality results with significantly fewer residual artifacts. Moreover, this architecture produces the final HDR results using only the original content of the aligned LDR images. Therefore, it should be used when staying faithful to the original content is a requirement.

3) Weight and Image Estimator (WIE):

In this architecture (shown in FIG. 2C), the restriction of the previous architecture is relaxed by allowing the network to output refined aligned images in addition to the blending weights. Here, the network takes the aligned LDR and HDR images as input and outputs the weights and the refined aligned images, $\{\alpha, \tilde{\mathcal{J}}\}$. Eq. (6) is used to compute the final HDR image using the refined images, $\tilde{I}_i$, and the estimated blending weights, $\alpha_i$.

Again, the derivative of the error with respect to the network weights can be computed using the chain rule as:

$$\frac{\partial E}{\partial w} = \frac{\partial E}{\partial \hat{T}} \frac{\partial \hat{T}}{\partial \hat{H}} \frac{\partial \hat{H}}{\partial \{\alpha, \tilde{\mathcal{J}}\}} \frac{\partial \{\alpha, \tilde{\mathcal{J}}\}}{\partial w}. \quad (9)$$

The only difference with respect to Eq. (7) lies in the third term, $\partial \hat{H}/\partial \{\alpha, \tilde{\mathcal{J}}\}$, as the network in this case outputs refined aligned images in addition to the blending weights.

The derivative of the estimated HDR image with respect to the estimated blending weights, $\partial \hat{H}/\partial \alpha$, can be estimated using Eq. (8). To compute $\partial \hat{H}/\partial \tilde{\mathcal{J}}$, the chain rule may be used to break it down into two terms as:

$$\frac{\partial \hat{H}}{\partial \tilde{I}_1} = \frac{\partial \hat{H}}{\partial \tilde{H}_1} \frac{\partial \tilde{H}_1}{\partial \tilde{I}_1}. \quad (10)$$

Here, the first term is the derivative of the estimated HDR image with respect to the aligned images in the HDR domain. The relationship between $\hat{H}$ and $\tilde{H}_1$ is given in Eq. (6), and thus, the derivative can be computed as:

$$\frac{\partial \hat{H}}{\partial \tilde{H}_1} = \frac{\alpha_i}{\sum_{j=1}^{3} \alpha_j}. \quad (11)$$

Finally, the second term in Eq. (10) is the derivative of the refined aligned images in the HDR domain with respect to their LDR version. Since the HDR and LDR images are related with a power function (see Eq. (6)), this derivative can be computed with the power rule as:

$$\frac{\partial \tilde{H}_1}{\partial \tilde{I}_1} = \frac{\gamma}{t_i} \tilde{I}_i^{\gamma-1}. \quad (12)$$

In some embodiments, the direct end-to-end training of this network may be challenging due to the convergence being very slow. Therefore, the training is performed in two stages. In the first stage, the network is forced to output the original aligned images as the refined ones, e.g., $\tilde{\mathcal{J}} = \mathcal{J}$, by minimizing the $l^2$ error of the output of the network and the original aligned images. This stage constrains the network to generate meaningful outputs and produce results with similar performance as the WE architecture.

In the second stage, a direct end-to-end training is performed and the network is further optimized by synthesizing refined aligned images. Therefore, this architecture is able to produce results with the best numerical errors. However, this additional flexibility in comparison to the WE architecture comes at the cost of producing slightly overblurred results in dark regions.

Network Architecture.

Figure 3:
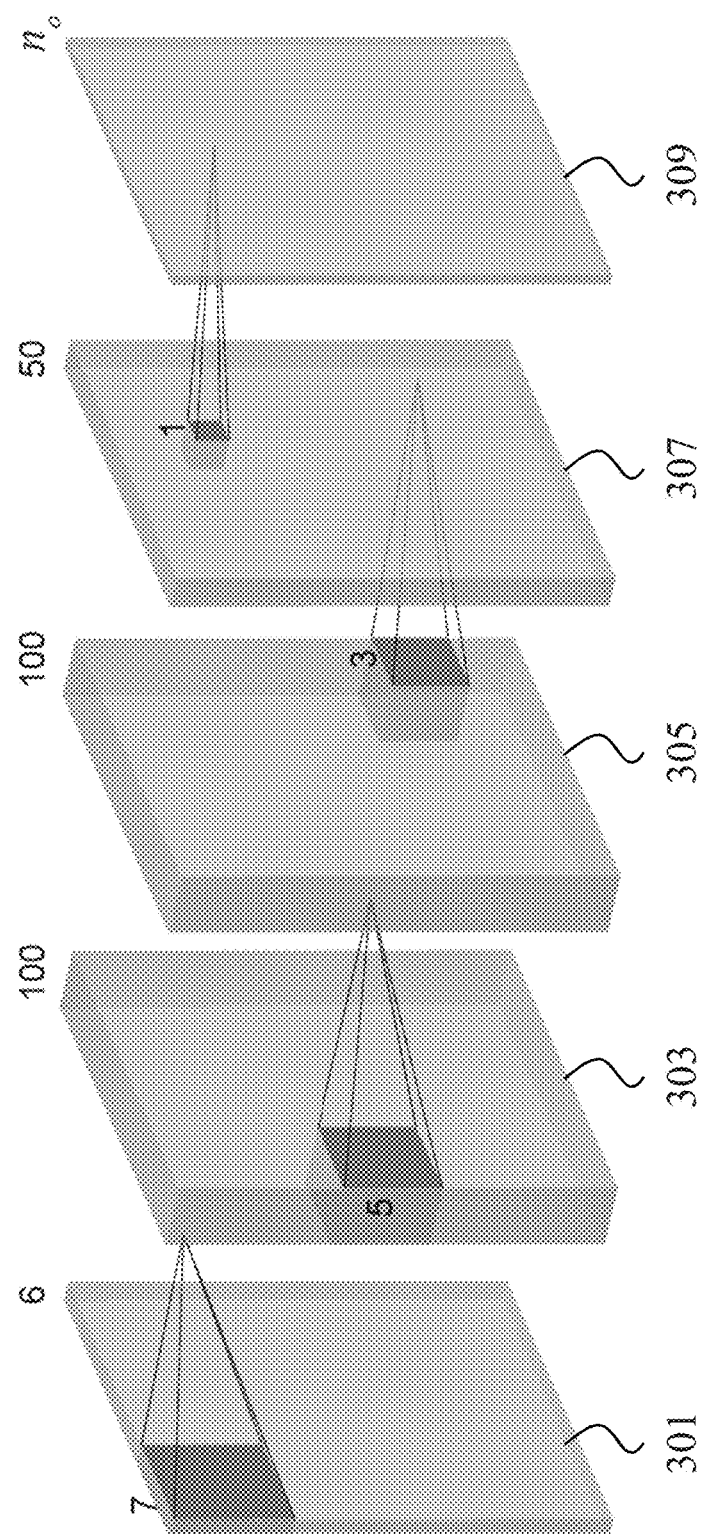
FIG. 3 shows an example of the layers in a convolutional neural network (CNN) with a decreasing kernel size.

In some embodiments, and as shown in FIG. 3, a CNN with four convolutional layers is used. This exemplary architecture was selected since it was able to successfully model the process of generating a novel view image from a set of aligned images, which is a similar but different problem. In this system, the networks have a decreasing filter size starting from 7 in the first layer (301) to 1 in the last layer (309). All the layers with the exception of the last layer are followed by a rectified linear unit (ReLU). For the last layer, a sigmoid activation function is used so the output of the network is always between 0 and 1. A fully convolutional network is used, so the system can handle images of any size. Moreover, the final HDR image at each pixel can usually be obtained from pixel colors of the aligned images at the same pixel or a small region around it. Therefore, in some embodiments, all the layers have stride of one, e.g., the network does not perform downsampling or upsampling. In other embodiments, the CNN may perform downsampling or upsampling in one or more of its layers.

The same network (as described in the context of FIG. 3) is used in the three system architectures, but with different number of output channels, $n_o$. Specifically, this number is equal to 3 corresponding to the color channels of the output HDR image in the direct architecture. In the WE architecture the network outputs the blending weights, $\alpha_1, \alpha_2, \alpha_3$, each with 3 channels, and thus, $n_o=9$. Finally, for the network in the WIE architecture $n_o=18$, since it outputs the refined aligned images, $\tilde{I}_1, \tilde{I}_2, \tilde{I}_3$, each with 3 color channels, in addition to the blending weights.

In summary, the three architectures produce high-quality results, but have small differences. The direct architecture is the simplest among the three, but in rare cases leaves small residual alignment artifacts in the results. The WE architecture is the most constrained one and is able to better suppress the artifacts in these rare cases. Finally, similar to the direct architecture, the WIE architecture is able to synthesize content that is not available in the aligned LDR images. However, the direct and WIE architectures slightly overblur images in dark regions to suppress the noise.

1.4 Examples of Dataset Generation for Training

Training deep networks usually requires a large number of training examples. For example, each training example should typically consist of a set of LDR images of a dynamic scene and their corresponding ground truth HDR image. In some embodiments, a custom training dataset is created and substantially extended through data augmentation; the various stages of generating the dataset are:

Capturing Process.

As described above, a training set should include a set of LDR images with motion and their corresponding ground truth HDR image. For this process, mostly static scenes are considered and a human subject is used to simulate motion between the LDR images.

Figure 4:
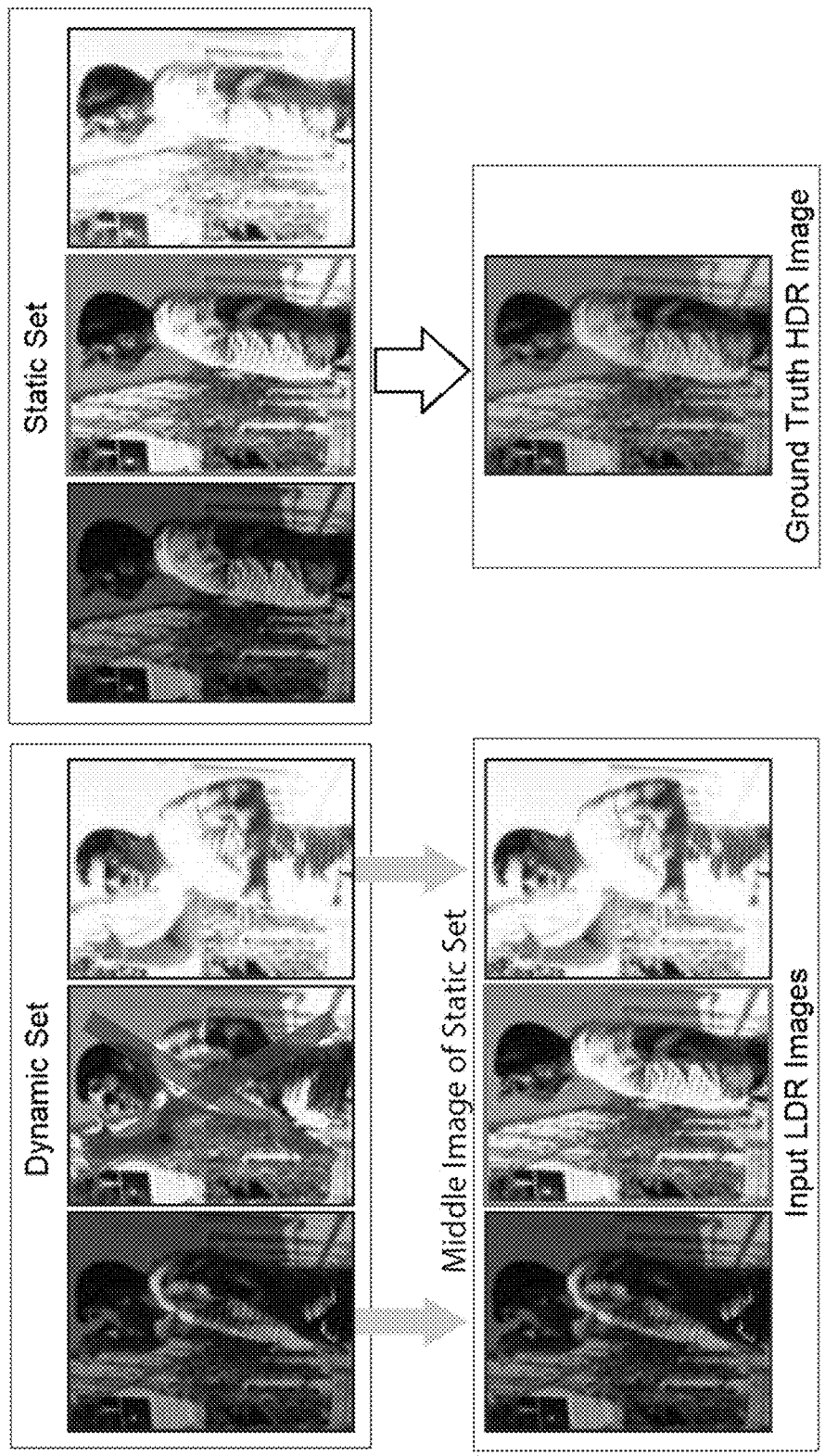
FIG. 4 shows an exemplary technique to create a training sample, which includes a set of input LDR images and their corresponding group truth images.

To generate the ground truth HDR image, a static set of images is captured by asking a subject to stay still and taking three images with different exposures on a tripod (see FIG. 4). In some embodiments, and since there is no motion between these captured LDR images, a simple triangle weighting scheme is used to merge them into a ground truth HDR image using Eq. (6). The weights in this case are defined as:

$$\alpha_1 = 1 - \Lambda_1(I_2), \alpha_2 = \Lambda_2(I_2), \alpha_3 = 1 - \Lambda_3(I_2). \quad (13)$$

Figures 5A, 5B, 5C:
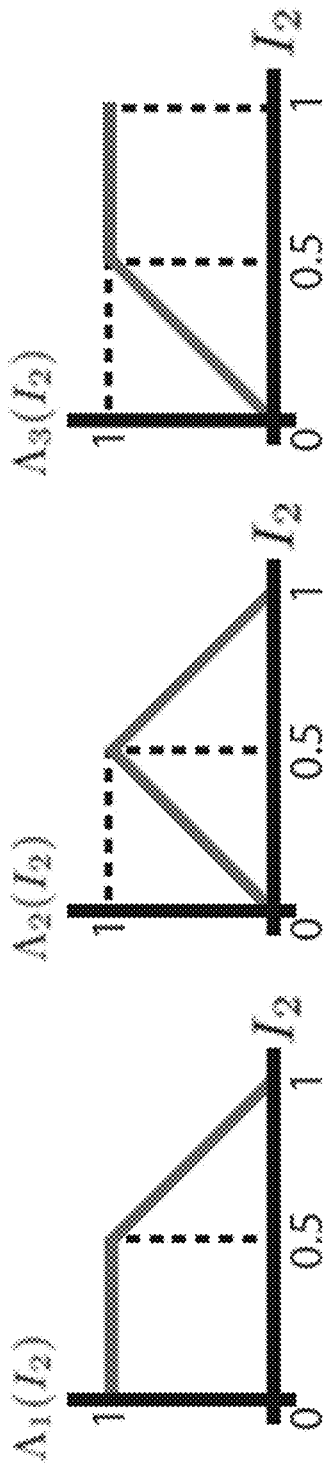
FIGS. 5A-5C show examples of functions used as blending weights used to generate the ground truth HDR images.
Figure 6:
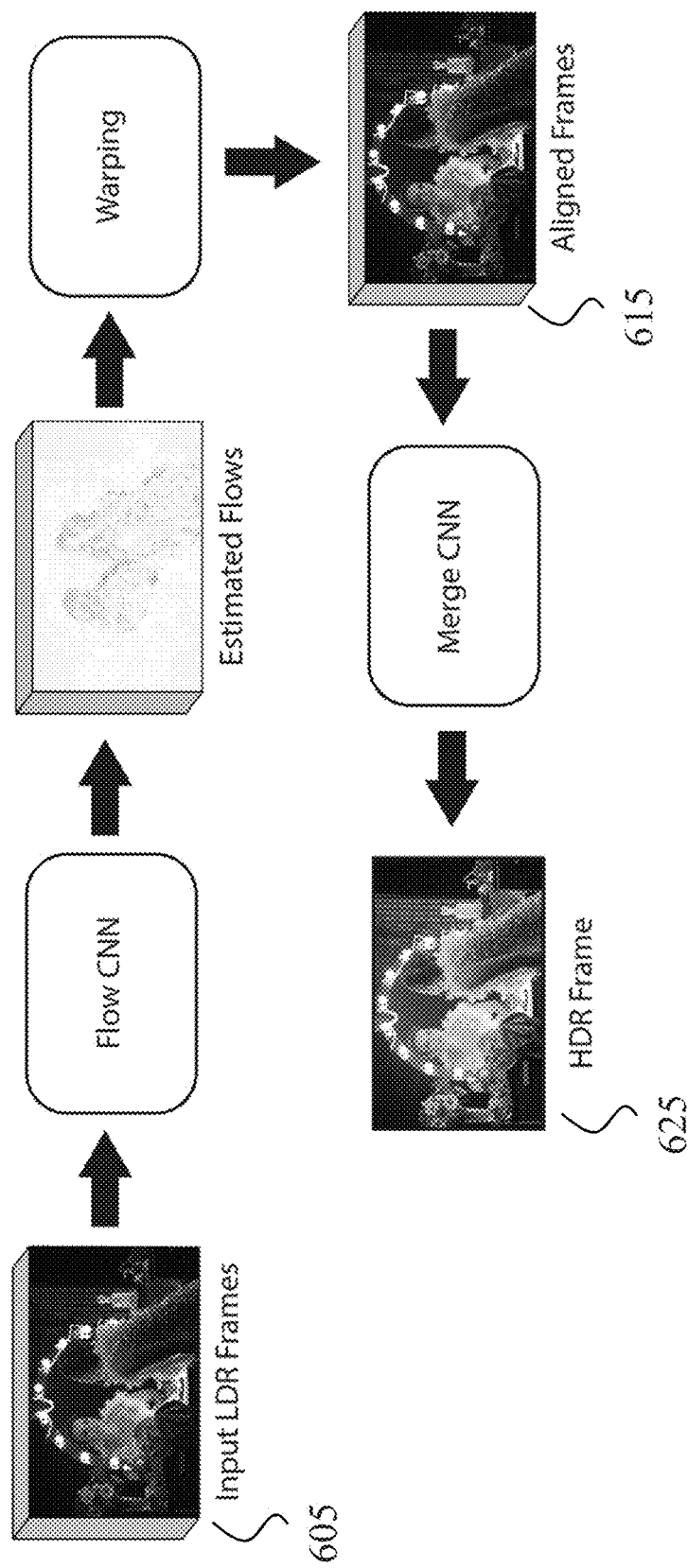
FIG. 6 shows an exemplary flowchart for generating an HDR frame of an HDR video based on input LDR frames.

Herein, $\Lambda_1, \Lambda_2$, and $\Lambda_3$ are shown in FIGS. 5A-5C, respectively. Although more sophisticated merging algorithms can be used to produce the ground truth HDR image, the simple triangle merge provides the required accuracy with minimal computational complexity.

Next, a dynamic set to use as the input is captured by asking the subject to move and taking three bracketed exposure images either by holding the camera (to simulate camera motion) or on a tripod (see FIG. 4). Since in the system, the estimated HDR image is aligned to the reference image (middle exposure), the middle image from the dynamic set is simply replaced with the one from the static set. Therefore, the final input set contains the low and high exposed images from the dynamic set as well as the middle exposed image from the static set.

In some embodiments, an exemplary training set included images that were captured in RAW format with a resolution of 5760×3840 and using a Canon EOS-5D Mark III camera. To reduce the possible misalignment in the static set, all the images (including the dynamic set) were downsampled to the resolution of 1500×1000. To ensure diversity of the training sets, the capture of the bracketed exposure images were separated by two or three stops.

Data Augmentation.

To avoid overfitting, data augmentation was performed to increase the size of the dataset. In an example, color channel swapping and geometric transformation (rotating 90 degrees and flipping) were used with 6 and 8 different combinations, respectively. This process produced a total of 48 different combinations of data augmentation, from 10 combinations were randomly chosen to augment each training scene. The data augmentation process increases the number of training scenes by a factor of 10.

Patch Generation.

Finally, since training on full images is slow, the training images are broken down into overlapping patches of size 40×40 with a stride of 20. This process produces a set of training patches consisting of the aligned patches in the LDR and HDR domains as well as their corresponding ground truth HDR patches. Then, the training patches where more than 50 percent of their reference patch is under/over-exposed are selected, which results in around 1,000,000 selected patches. This selection is performed to put the main focus of the networks on the challenging regions.

2 Exemplary Embodiments for Generating HDR Videos

Embodiments of the disclosed technology can produce a high-quality HDR video from an input LDR video with alternating exposures. For simplicity, the exemplary method is described for the case with two alternating exposures and the extension to three exposures is discussed later in the document. In this case, the input LDR video consists of a set of frames, $Z_i$, alternating between low and high exposures. The frames with low exposure are usually noisy in the dark regions, while the high exposure frames lack content in the bright areas because of the sensor saturation.

To produce an HDR frame, $H_i$, the missing content at frame i (reference) needs to be reconstructed using the neighboring frames with different exposures ($Z_{i-1}$ and $Z_{i+1}$). In some embodiments, it is assumed that the entire video is a single shot. For a video containing multiple shots, it may be broken down into smaller single shot videos and the results produced for each segment separately. This is a challenging problem as it requires reconstructing high-quality and temporally coherent HDR frames. In some embodiments, convolutional neural networks (CNN) may be used to learn the HDR video reconstruction process from a set of training scenes.

In some of the disclosed embodiments, in addition to modeling the merge process using the merge network, a flow network is proposed to perform the alignment process. These two networks are trained in an end-to-and fashion by minimizing the error between the reconstructed and ground truth HDR frames on a set of training scenes. The learned flow network is designed for the HDR video reconstruction application and performs better than the traditional optical flow methods and learning-based flow estimation approaches. In some embodiments, CNNs are able to model complex processes and can be efficiently implemented on GPUs, which makes them fast. Moreover, if trained in an end-to-end fashion, they systematically model the underlying process and produce results that are comparable to the ground truth.

2.1.1 Preprocessing

In some embodiments, and to reduce the complexity of the process for the learning system, the neighboring frames are globally aligned to the reference frame using a similarity transform (rotation, translation, and isometric scale). For example, this may be achieved by finding the corresponding corner features in the reference and each neighboring image and then using RANSAC to find the dominant similarity model from the calculated correspondences. Furthermore, the original camera response function (CRF) of the input images may be replaced with a gamma curve. Specifically, all the frames are first transformed into the linear HDR domain by applying inverse CRF, e.g., $I_i = f^{-1}(\tilde{Z}_i) t_i$, where f is the CRF and $t_i$ is the exposure time of frame i. Then, a gamma curve with $\gamma=2.2$ is used to transfer the images from HDR to LDR domain $l_i(I_i)$:

$$Z_i = l_i(I_i) = \text{clip}[(I_i t_i)^{1/\gamma}]. \tag{14}$$

Herein, clip is a function that keeps the output in the range [0, 1] and $l_i$ is a function that transfers the image $I_f$ from the linear DR domain into LDR domain at exposure i (see the notations in Table 1).

TABLE 1

| Notations used in the present document | |
| --- | --- |
| $\tilde{Z}_i$ | input LDR frames with alternating exposures |
| $Z_i$ | input LDR frames after alignment and CRF replacement |
| $H_i$ | the HDR image at frame i |
| $T_i$ | the HDR image at frame i in the log domain |
| $t_i$ | exposure time at frame i |
| $h(Z_i)$ | takes image $Z_i$ from the LDR to the linear HDR domain: $h(Z_i) = Z_i^\gamma/t_i$ |
| $I_i$ | result of taking image $Z_i$ to the linear HDR domain, e.g., $I_i = h(Z_i)$ |
| $l_i(I_j)$ | takes image $I_j$ from the linear domain to the LDR domain at exposure i: $l_i(I_j) = \text{clip}\,[(I_j t_i)^{1/\gamma}]$ |
| $g_i(Z_j)$ | adjust the exposure of image $Z_j$ to that of frame i, e.g., $g(Z_j) = l_i\,(h(Z_j))$ |
| $Z_{i-1,i}$ | the result of aligning image $Z_{i-1}$ to $Z_i$ |

Overall, the preprocessing step globally aligns $\tilde{Z}_{i-1}$ and $\tilde{Z}_{i+1}$ to the reference image, $\tilde{Z}_i$, and replaces the original CRF with a gamma curve to produce $Z_{i-1}$, $Z_{i+1}$, and $Z_i$. These processed images are used as the input to the system.

2.1.2 Flow Network

To reconstruct the missing content at frame i, we first need to align the neighboring frames to the reference frame. This requires estimating the flows from the frames, i−1 and i+1, to the reference frame, i. The estimated flows can then be used to warp the neighboring images, $Z_{i-1}$ and $Z_{i+1}$, and produce a set of aligned images, $Z_{i-1,i}$ and $Z_{i+1,i}$. Note that, the neighboring images, $Z_{i-1}$ and $Z_{i+1}$, are globally aligned to the reference image, $Z_i$, and thus, this process handles the non-rigid motion, possible parallax, and the potential inaccuracies of the global alignment.

Embodiments of the disclosed technology use CNNs to model the flow estimation process for reasons, some of which have been described above. First, CNNs are efficient and can be implemented on the GPU, and thus, they are significantly faster than the non-learning optimization-based optical flow methods. Second, the flow estimation is only one component of the system with the overall goal of producing high-quality HDR videos. By training the system in an end-to-end fashion, the flow estimation is optimized to maximize the quality of the HDR videos. Therefore, the flow estimation network is better suited for the HDR video reconstruction application than the existing flow estimation techniques.

In some embodiments, two input images may be used to estimate the flow between ground truth and estimated HDR frames. However, this is typically unsuitable for HDR Video reconstruction. In some of the disclosed embodiments, since the reference image often has missing content (e.g., because of noise), and thus, estimating an accurate flow from each neighboring frame to the reference frame using only two input images is difficult.

To avoid this problem, the reference, $Z_i$, and the neighboring frames, $Z_{i-1}$ and $Z_{i+1}$, are used as the input to the system. In this case, in regions where the reference image has missing content, the neighboring images can be used to estimate the appropriate flows. However, since the input frames are captured with alternating exposures, the reference and neighboring frames have different exposure times and, consequently, different brightness. This issue is addressed by adjusting the exposure of the reference frame to match that of the neighboring frames $g_{i+1}(Z_i)$:

$$g_{i+1}(Z_i) = l_{i+1}(h(Z_i)). \tag{15}$$

Herein, $h(Z_i)$ is a function that takes the image $Z_i$ from the LDR domain to the linear HDR domain and is defined as:

$$h(Z_i) = Z_i^\gamma / t_i. \tag{16}$$

The input is then obtained by concatenating the exposure adjusted reference image as well as the two neighboring frames (9 channels), e.g., $\{g_{i+1}(Z_i), Z_{i-1}, Z_{i+1}\}$. The network takes this input and produces an output with 4 channels, consisting of two sets of flows from the previous, i−1, and next, i+1, frames to the reference frame, i, in x and y directions. These flows are then used to warp the neighboring images to produce a set of aligned images. Note that the inputs and outputs of the flow network are slightly different for the cases with three exposures, as is discussed later in the document.

Figure 7:
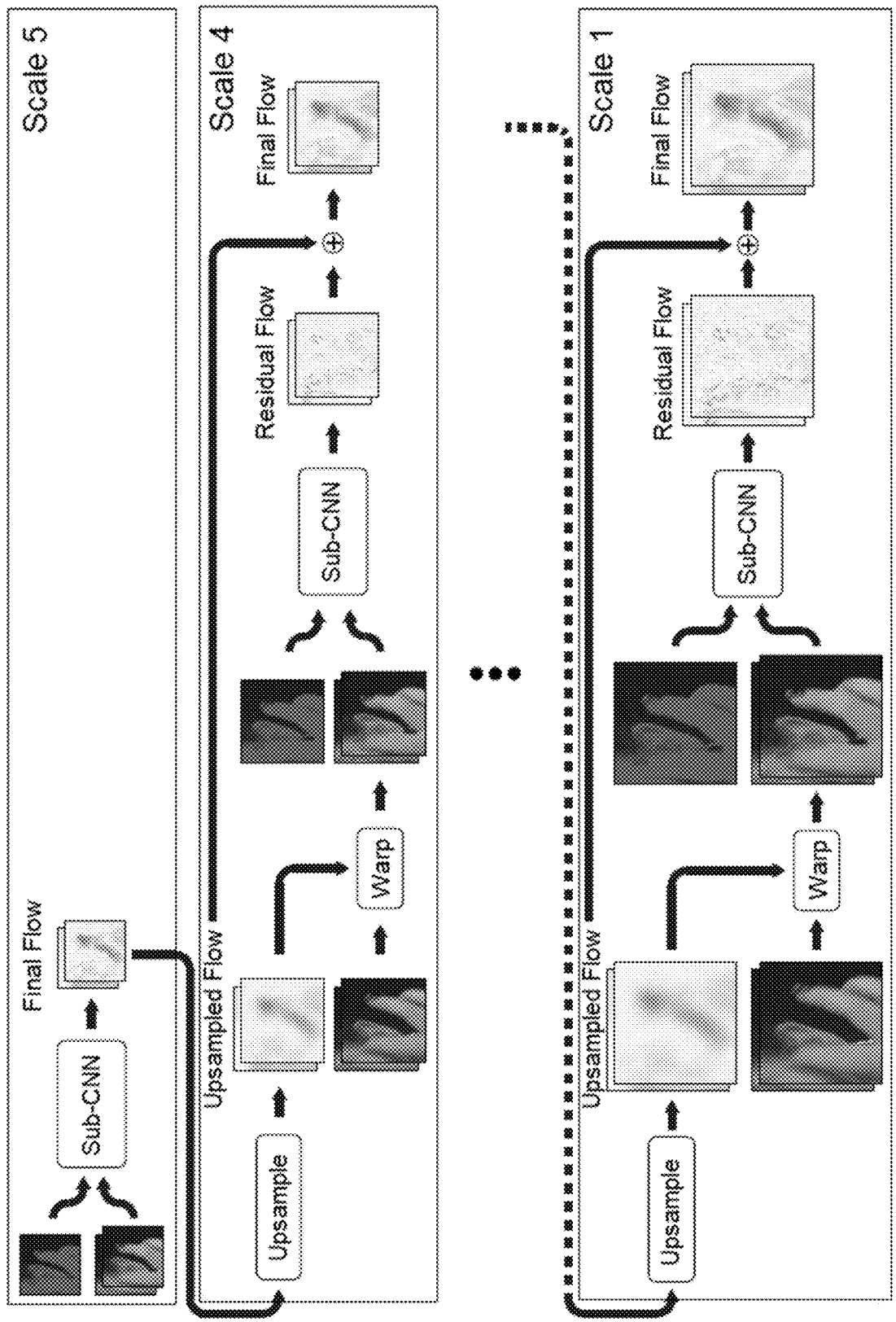
FIG. 7 shows an example of a hierarchical coarse-to-fine network architecture used to align images based on a plurality of CNNs.
Figure 8:
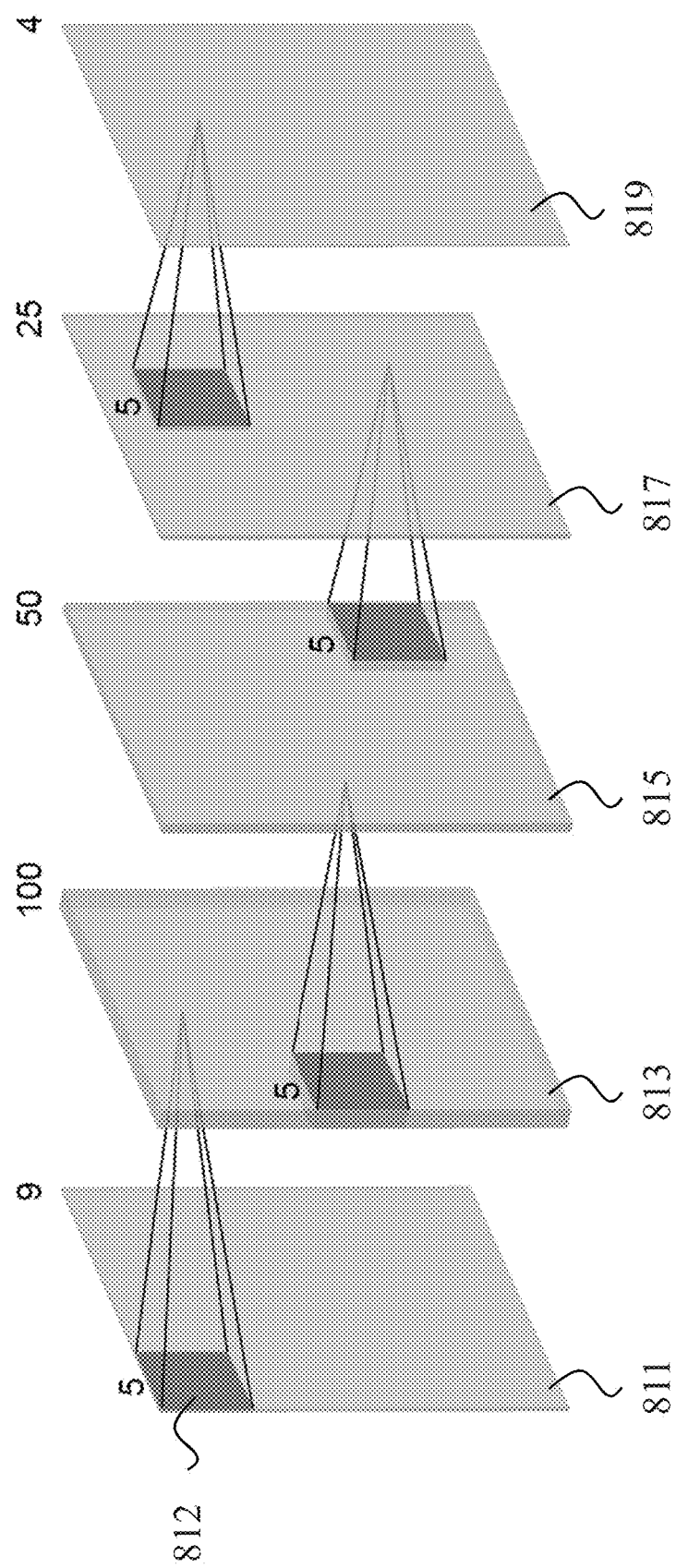
FIG. 8 shows another example of layers in a CNN with their respective kernel sizes.

In some embodiments of the flow network, the hierarchical coarse-to-fine architecture is leveraged, and incorporates the three inputs into the architecture, as shown in FIG. 7. The system consists of a series of flow estimator CNNs working at different resolutions. The estimated flows at the coarser scales capture the large motions and are used to initialize the inputs for the CNN in the finer scales, which are responsible for estimating the smaller motions. FIG. 8 shows an exemplary architecture of the sub-CNNs used in the flow network, which includes four convolutional layers with a kernel size of 5. Each layer (811, 813, 815 and 817) is followed by a rectified linear unit (ReLU), except for the last one (819), which has a linear activation function.

In an example, a pyramid of the three input images is generated by downsampling them using factors of 16, 8, 4, and 2. The three images at different resolutions are used as the input to their corresponding scale. At the coarsest scale ("Scale 5" in FIG. 7), the input images at that resolution are used to produce two sets of flows. These flows are then upsampled and used to warp the two neighboring images. The warped neighboring images as well as the reference image are then used as the CNN's input to produce two sets of flow at this finer resolution. Note that the estimated flows are computed between the warped neighboring images and the reference image. Therefore, the full flow is obtained by adding the upsampled flow from the previous scale and the estimated flows at this scale. This process is repeated until reaching the finest scale and producing the final flows. The calculated flows are then used to warp the neighboring images and produce a set of aligned images, $Z_{i-1,i}$ and $Z_{i+1,i}$. These images are used by the merge network to produce the final result.

Note that the flow network is advantageously enables the production of high-quality results by correcting non-rigid motions in the neighboring frames. Without this component, the regions with motion in the neighboring frames cannot be properly used to reconstruct the final HDR frame. In these areas, the merge network would either rely on the reference image or combine the misaligned images and produce noisy or ghosted results.

2.1.3 Merge Network

In some embodiments, this network produces a high-quality HDR frame from the aligned and reference images. Since the registered images contain residual alignment artifacts, this network detects these artifacts and exclude them from the final HDR image. Some features of the merge network include:

Input/Output.

As previously described, the embodiments used to generated HDR images use the aligned images, including the reference image, as the input to the network. This strategy is adapted to to HDR video, to provide the two aligned neighboring images, $Z_{i-1,i}$ and $Z_{i+1,i}$, as well as the reference image, $Z_i$, to the network to produce the final HDR image. However, in some cases both aligned images contain artifacts around the motion boundaries, which may appear in the resulting HDR image.

To address this issue, these artifacts are observed to happen, in most cases, on the background regions. However, these areas are usually well-aligned in the original neighboring images. Therefore, in addition to the three images, the neighboring images in the system, e.g., $\{Z_i, Z_{i-1,i}, Z_{i+1,i}, Z_{i-1}, Z_{i+1}\}$ are also used. These additional inputs help the merge network to produce high-quality results.

In some embodiments, five images in both the LDR and linear HDR domains are provided as the input to the network (30 channels). The network then estimates the blending weights for these five images (15 channels output). A blending weight is estimated for each color channel to properly utilize the information in each channel. The final HDR image at frame i, $H_i$, is computed as a weighted average of the five input images using their blending weights as:

$$H_i = \frac{w_1 I_i + w_2 I_{i-1,i} + w_3 I_{i+1,i} + w_4 I_{i-1} + w_5 I_{i+1}}{\sum_{k=1}^{5} w_k}. \tag{17}$$

Herein, $w_k$ is the estimated blending weight for each image and $I_i = h(Z_i)$, where $h(Z_i)$ is the function that takes the image $Z_i$ from the LDR to the linear HDR domain. Note that the system increases the dynamic range by directly combining the pixel values of the input and warped images and does not hallucinate content.

Architecture.

Figure 9:
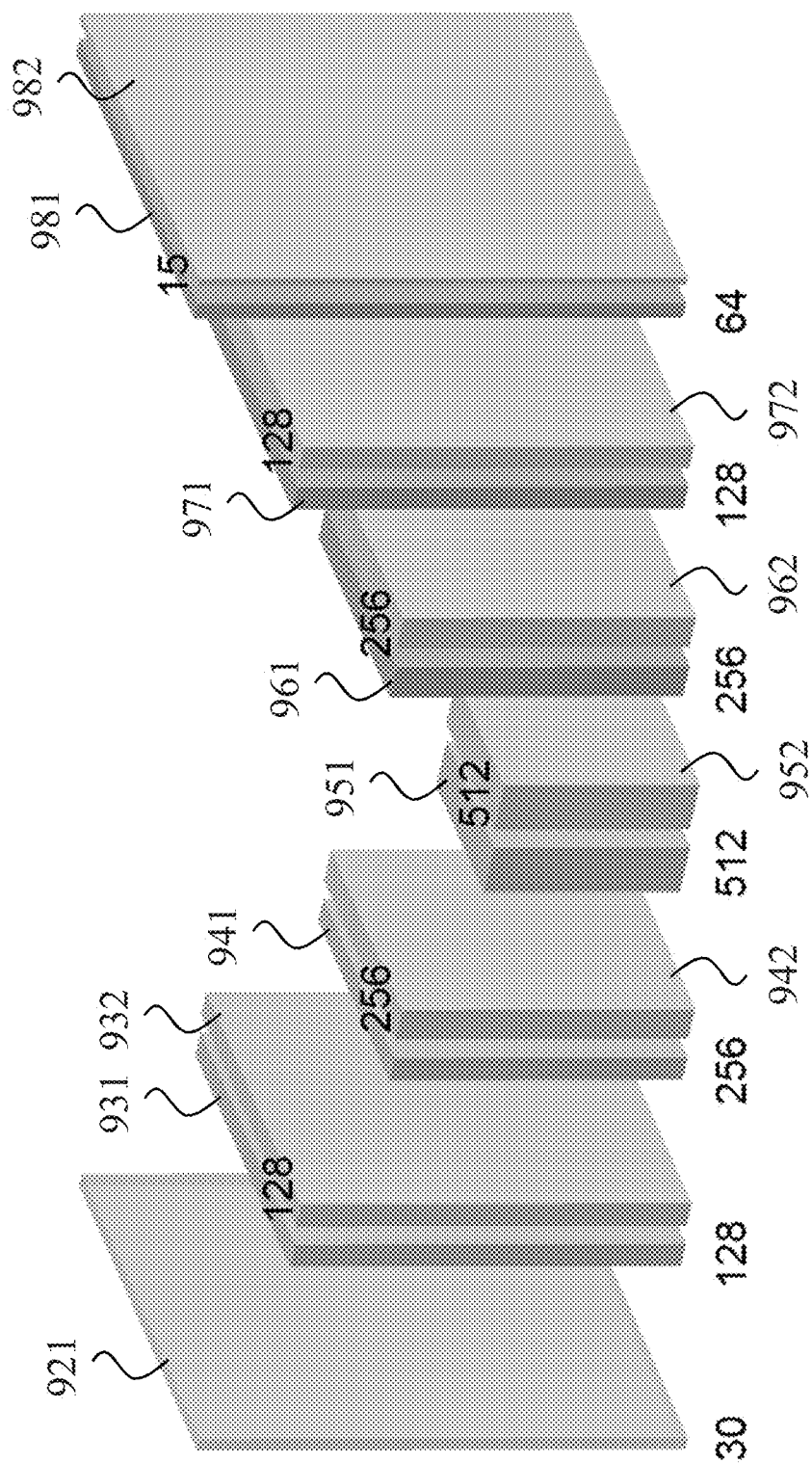
FIG. 9 shows an exemplary architecture of the merge network.

Embodiments of the disclosed technology, and since in some cases the network needs to see a bigger region to properly distinguish the alignment artifacts from structures, an encoder-decoder architecture for modeling the HDR merge process is used. Specifically, a fully convolutional architecture with three downsampling (encoder) and upsampling (decoder) units is used, as shown in FIG. 9. Each downsampling unit consists of a {\it convolution} layer with stride of two, followed by another convolution layer with stride of one. The upsampling units consist of a {\it deconvolution} layer with stride of two, followed by a convolution layer with stride of one. A sigmoid is used as the activation function of the last layer, but all the other layers are followed by a ReLU.

As shown in FIG. 9, the first set of boxes (921, 931, 941, 951) and the second set of boxes (961, 971, 981) correspond to the convolution and deconvolution layers with stride of two and kernel size of four, respectively. These layers basically downsample (first set) or upsample (second set) the feature maps by a factor of two. The third set of boxes (932, 942, 952, 962, 972, 982) are simple convolutions with stride of one and kernel size of three. With the exception of the last layer, which has a sigmoid activation function, all the other layers are followed by a ReLU. The merge network takes five images in the LDR and linear HDR domains (30 channels) as the input and produces blending weights for these five images (15 channels).

2.1.4 Exemplary Extension to Three Exposures

In this case, the input video alternates between three (low, medium, and high) exposures. For example, a sequence of $Z_{i-2}$, $Z_{i-1}$, $Z_i$, $Z_{i+i}$, and $Z_{i+2}$ frames can have low, medium, high, low, and medium exposures, respectively. Here, the system utilizes four neighboring images in addition to the reference image to reconstruct a single HDR frame.

To adapt the system to this case, the inputs and outputs of the flow and merge CNNs are adjusted. Specifically, the flow CNN takes $Z_{i-2}$, $Z_{i+1}$, and $g_{i+1}(Z_i)$, as well as $Z_{i-1}$, $Z_{i+2}$, and $g_{i+2}(Z_i)$ as the input. Here, $g_{i+1}(Z_i)$ and $g_{i+2}(Z_i)$ refer to the exposure adjusted versions of the reference image. Therefore, in total the flow network takes six images as the input (18 channels). The flow network then outputs four flows (8 channels), which can be used to warp the four neighboring images to the reference image. These four aligned images ($Z_{i-2,i}$, $Z_{i-1,i}$, $Z_{i+1,i}$, $Z_{i+2,i}$) along with the original neighboring ($Z_{i-2}$, $Z_{i-1}$, $Z_{i+1}$, $Z_{i+2}$) and the reference image ($Z_i$) in both LDR and linear HDR domains (54 channels) are used as the input to the merge network to produce the final HDR frame.

2.2 Training

As with most machine learning approaches, embodiments of the disclosed technology includes the two main stages of training and testing. During training, which is an offline process, optimal weights of the networks are found through an optimization process. This requires 1) an appropriate metric to compare the estimated and ground truth HDR images and 2) a large number of training scenes. Once the training is done, the trained networks may be used to generate results on new test scenes. In the next sections, the choice of loss function and the dataset is discussed.

2.2.1 Loss Function

HDR images and videos are typically displayed after tonemapping, a process that generally boosts the pixel values in the dark regions. Therefore, defining the loss function directly in the linear HDR domain, underestimates the error in the dark areas. To avoid this problem, the HDR images are transferred into the log domain using the differentiable function:

$$T_i = \frac{\log(1 + \mu H_i)}{\log(1 + \mu)}. \tag{18}$$

Herein, $H_i$ is the HDR frame and is always in the range [0, 1] and $\mu$ (set to 5000) is a parameter controlling the rate of range compression. To train the system, the $l_1$ distance between the estimated, $\hat{T}_1$, and ground truth, $T_i$, HDR frames is minimized in the log domain:

$$E = \|\hat{T}_1 - T_i\|_1. \tag{19}$$

In some embodiments, this error is directly minimized to train both the flow and merge networks, and thus, the ground truth flows are not needed for training. Since all the components of the system, including the warping, are differentiable, the required gradients may be computed using the chain rule. These gradients are used to update the networks' weights iteratively until convergence.

2.2.2 Dataset

In some embodiments, a large number of training scenes consisting of three input LDR frames with alternating exposures (a reference frame and two neighboring frames) and their corresponding ground truth HDR frame are needed to train the network. The training set is constructed by selecting 21 scenes from two publicly available HDR video datasets, which consist of hundreds of HDR frames for each scene, captured using cameras with specific optical designs containing external and/or internal beam-splitters.

To generate the training set from these datasets, three consecutive frames from a scene are selected and transformed to the LDR domain (see Eq. (14)), using two different exposure times. In the system, these three images are used as the input, and the middle HDR frame is selected to be used as the ground truth. The datasets are generated with exposures separated by one, two, and three stops, where the low exposure time is randomly selected around a base exposure. The data is augmented by applying geometric transformations (rotating 90 degrees and flipping) on the training data.

Since this dataset is produced synthetically, a system trained on it may not work properly on scenes captured with off-the-shelf cameras. In practice, real world cameras capture noisy images and are also hard to calibrate. However, the synthetic dataset lacks these imperfections. To address this issue, the imperfections of standard cameras are simulated. For example, noise and tone adjustment strategies as well as a mechanism for patch generation.

Adding Noise.

The images captured with standard digital cameras typically contain noise in the dark regions. Therefore, to produce a high-quality HDR image, the information in the dark areas should be taken from the image with the high exposure. Unfortunately, since the input LDR images are generated synthetically, the images with different exposures contain the same amount of noise as their HDR counterparts. Therefore, if the system is trained on this dataset, the merge network may not able to utilize the content of the high exposure image in the dark regions, often producing noisy results in real-world scenarios.

In some embodiments, this problem is addressed by adding zero-mean Gaussian noise, a commonly-used image noise model, to the input LDR images with low exposure. This increases the robustness of the flow network and encourages the merge network to use the content of the clean high exposure image in the dark regions. Note that, the noise is added in the linear domain, and thus, the noise in the dark areas are typically magnified after transferring the image to the LDR domain. In an exemplary implementation, the standard deviation is randomly chosen between $10^{-3}$ and $3 \times 10^{-3}$, to advantageously enable the system to learn to handle noise with different variances.

Tone Perturbation.

In practice, calibrating the cameras and finding the exact camera response function (CRF) is usually difficult. Therefore, the color and brightness of the neighboring images are often slightly different from those of the reference image even after exposure adjustment. However, the LDR images are extracted synthetically, and thus, are consistent. Therefore, training the system on this dataset limits the ability of both the flow and merge network to generalize to the scenes captured with standard cameras.

To avoid this issue, the tone of the reference image is slightly perturbed by independently applying a gamma function to its different color channels. Specifically, gamma encoding with $\gamma=\exp(d)$, where d is randomly selected from the range [−0.7, 0.7], is applied. This perturbed reference image is used as the input to our flow and merge networks, so the networks learn to handle the inconsistencies of the reference and neighboring images when estimating the flows and the blending weights. However, the original reference image along with the neighboring images are used during the blending process (Eq. (17)) to produce HDR images that match the ground truth. Note that since the neighboring frames have the same exposure their color and brightness always match even when the estimated CRF is highly inaccurate. Therefore, the perturbation is only applied on the reference image.

As noted previously, the two stage architecture advantageously enables this perturbation strategy to work. In the case of modeling the entire process with one network, the CNN takes the neighboring images, as well as the perturbed reference image and should produce the final HDR image. This requires the CNN to undo a random tone adjustment applied on the reference image, which is difficult.

Patch Generation.

In some embodiments, and as is common with the deep learning systems, the images are broken down into small overlapping patches of size 352×352 with a stride of 176. Most patches in the dataset contain static backgrounds, which are not useful for training the flow network. Therefore, a patch is only selected if the two neighboring images have more than 2000 pixels with absolute difference of 0.1 and more.

3 Exemplary Methods for Generating HDR Images and Video

FIG. 10 shows a flowchart of an exemplary method 1000 for generating HDR visual media. The method 1000 includes, at step 1010, generating, using a first convolutional neural network (CNN) to merge a first set of images having a first dynamic range, a final image having a second dynamic range that is greater than the first dynamic range.

In some embodiments, the first of images may be input images that exhibit some degree of misalignment. In other embodiments, the method 1000 further includes the step of generating the first set of images based on performing an alignment of a set of input images having the first dynamic range. In an example, performing the alignment of the set of input images is based on using the first CNN. In another example, performing the alignment of the set of input images is based on an optical flow algorithm. In yet another example, performing the alignment of the set of input images is based on a second CNN that is configured differently from the first CNN.

In some embodiments, each of the first set of images having the first dynamic range have a same exposure or different exposures.

In some embodiments, and in the context of Section 2, performing the alignment of the set of input images includes processing the set of input images to achieve brightness constancy, computing, using an optical flow algorithm, a flow between each of the set of input images and a reference image, wherein the reference image is predetermined, and warping, using a bicubic interpolation, each of the set of input images based on the corresponding flow to generate a corresponding image of the first set of images.

In some embodiments, and as described in the context of FIG. 2A, generating the final image may include generating a second set of images having the second dynamic range, aligning the second set of images to generate a third set of images having the second dynamic range, and merging, using the first CNN, the third set of images to generate the final image, where each of the second set of images having the second dynamic range is based on a corresponding image of the set of input images having the first dynamic range, an exposure time of the corresponding image, and an encoding gamma.

Figure 2B:
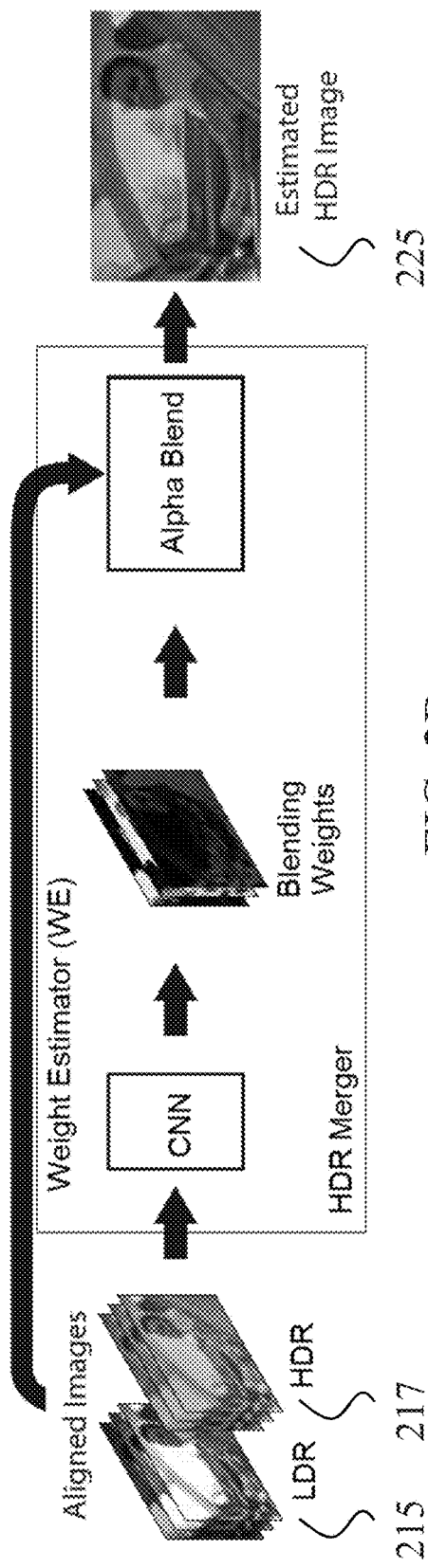

In some embodiments, and as described in the context of FIG. 2B, generating the final image may include generating a second set of images having the second dynamic range, aligning the second set of images to generate a third set of images having the second dynamic range, generating, based on the first set of images and the third set of images, a set of blending weights using the first CNN, and generating, based on the set of blending weights, the final image as a weighted sum of the third set of images having the second dynamic range.

Figure 2C:
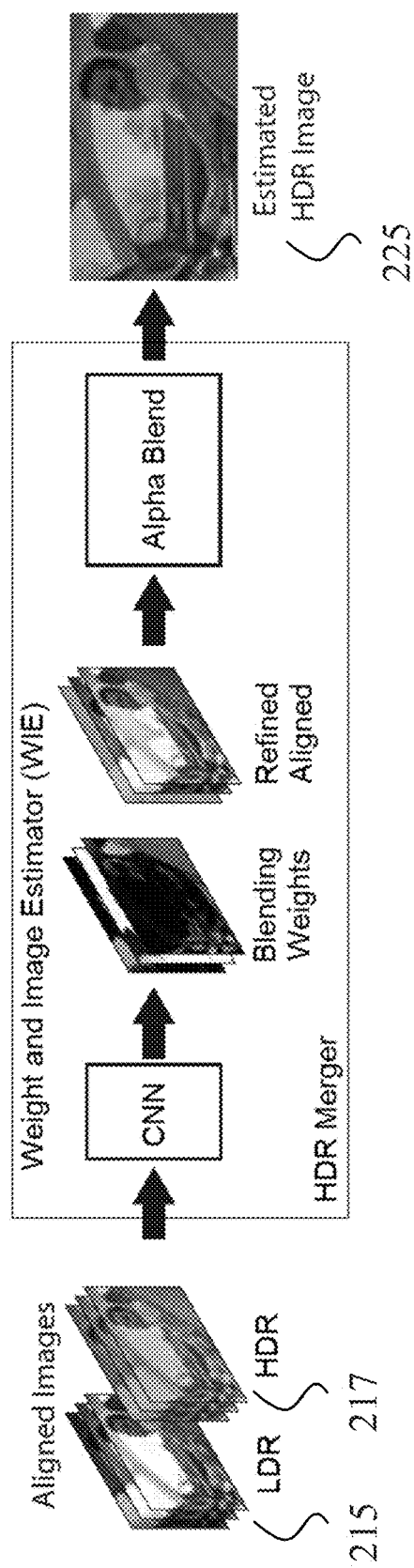

In some embodiments, and as described in the context of FIG. 2C, generating the final image may include generating a second set of images having the second dynamic range, aligning the second set of images to generate a third set of images having the second dynamic range, generating, based on the first set of images and the third set of images, a set of blending weights and a set of refined aligned images using the first CNN, and generating, based on the set of blending weights, the final image as a weighted sum of the set of refined aligned images.

In some embodiments, the method 1000 further includes the step of training the CNN based on minimizing an error between a set of ground truth images having the second dynamic range and a set of estimated images having the second dynamic range, wherein the set of estimated images are generated by the CNN. In one example, the set of ground truth images are tonemapped, and wherein the set of estimated images are tonemapped. In some embodiments, training the CNN include generating, using the first CNN with an input comprising the first set of images, a set of estimated images having the second dynamic range, and minimizing an error between a set of ground truth images and the set of estimated images.

In some embodiments, performing the alignment of the set of input images is based a plurality of optical flows generated using a plurality of sub-CNNs, each of which may operate at a different resolution.

FIG. 11 shows a flowchart of an exemplary method 1100 for generating training data, which may be used for generating HDR visual media. The method 1100 includes, at step 1110, generating a set of static images having a first dynamic range.

The method 1100 includes, at step 1120, generating, based on a weighted sum of the set of static images, a set of ground truth images having a second dynamic range greater than the first dynamic range.

The method 1100 includes, at step 1130, generating a set of dynamic images having the first dynamic range.

The method 1100 includes, at step 1140, replacing at least one of the set of dynamic images with an image from the set of static images to generate a set of training images.

In some embodiments, and in the context of Section 1.4, the method 1100 may further include the steps of generating an additional set of training images with the first dynamic range and an additional set of ground truth images with the second dynamic range based on color channel swapping and geometrically transforming the set of training images with the first dynamic range and the set of ground truth images with the second dynamic range, respectively, generating the training data by selecting image segments from the set of training images with the first dynamic range and the additional set of training images with the first dynamic range, and selecting corresponding image segments from the set of ground truth images with the second dynamic range and the additional set of ground truth images with the second dynamic range.

In some embodiments, at least a portion of each of the image segments that are selected comprise pixels that are under- or over-exposed compared to an under-exposure threshold and an over-exposure threshold.

In some embodiments, the method 1100 may further include applying a random gamma encoding to one or more color channels of at least some of the set of training images with the first dynamic range.

In some embodiments, the method 1100 may further include adding zero-mean Gaussian noise to at least some of the set of training images with the first dynamic range that have an exposure less than an exposure threshold.

4 Example Implementations of the Disclosed Technology

Figure 12:
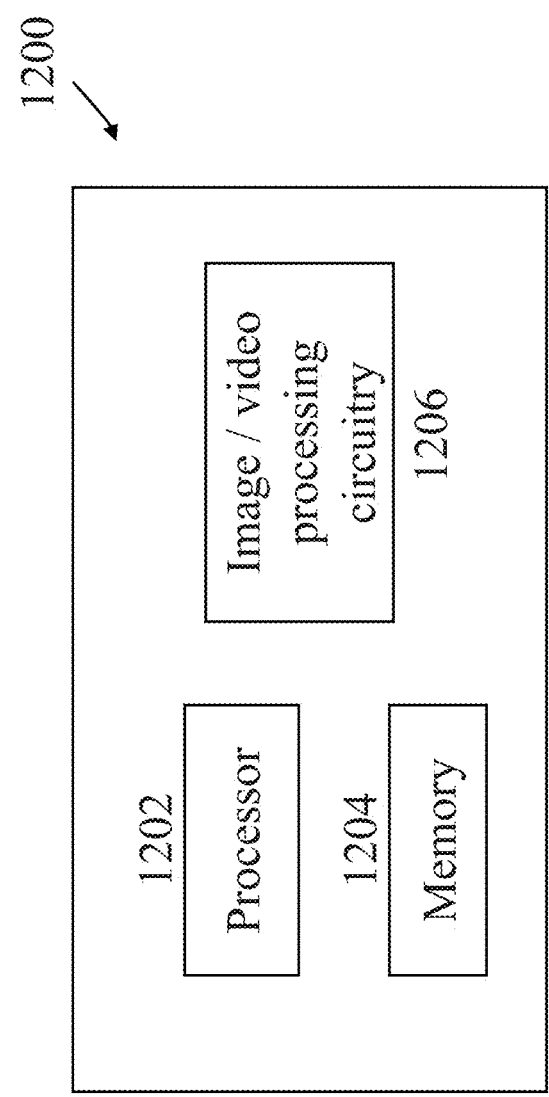
FIG. 12 is a block diagram of an example of a hardware platform for implementing the video and/or image processing methods described in the present document.

FIG. 12 is a block diagram of an image and/or video processing apparatus 1200. The apparatus 1200 may be used to implement one or more of the methods described herein. The apparatus 1200 may be embodied in a smartphone, tablet, computer, Internet of Things (IoT) receiver, digital cameras, digital single-lens reflex (SLR) cameras, and so on. The apparatus 1200 may include one or more processors 1202, one or more memories 1204 and image/video processing hardware 1206. The processor(s) 1202 may be configured to implement one or more methods (including, but not limited to, methods 1000 and 1100) described in the present document. The memory (or memories) 1204 may be used for storing data and code used for implementing the methods and techniques described herein. The image and/or video processing hardware 1206 may be used to implement, in hardware circuitry, some techniques, algorithms or methods described in the present document.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for visual media processing, comprising:
generating a first set of images based on performing an alignment of a set of input images having a first dynamic range, the first set of images having the first dynamic range;
generating a second set of images having a second dynamic range that is greater than the first dynamic range;
aligning the second set of images to generate a third set of images having the second dynamic range; and
generating, using a first convolutional neural network (CNN) and based on at least the third set of images, a final image having the second dynamic range,
wherein the alignment of the set of input images is performed using a plurality of sub-CNNs, wherein each of the plurality of sub-CNNs operates at a distinct resolution, and wherein at least one of the plurality of sub-CNNs is followed by a rectified linear unit (ReLU).

2. The method of claim 1, wherein each of the first set of images having the first dynamic range have a same exposure or different exposures.

3. The method of claim 1, wherein performing the alignment of the set of input images is based on an optical flow algorithm.

4. The method of claim 1, wherein performing the alignment of the set of input images is further based on a plurality of optical flows generated using a corresponding sub-CNN of the plurality of sub-CNNs.

5. The method of claim 4, further comprising:
generating, using the first CNN with an input comprising the first set of images, a set of estimated images having the second dynamic range; and
minimizing an error between a set of ground truth images and the set of estimated images.

6. The method of claim 1, wherein a last of the plurality of sub-CNNs is followed by a linear activation function.

7. An apparatus for visual media processing, comprising:
a processor; and
a memory that comprises instructions stored thereupon, wherein the instructions when executed by the processor configure the processor to:
generate a first set of images based on performing an alignment of a set of input images having a first dynamic range, the first set of images having the first dynamic range;
generate a second set of images having a second dynamic range that is greater than the first dynamic range;
align the second set of images to generate a third set of images having the second dynamic range; and
generate, using a first convolutional neural network (CNN) and based on at least the third set of images, a final image having the second dynamic range,
wherein the alignment of the set of input images is performed using a plurality of sub-CNNs, wherein each of the plurality of sub-CNNs operates at a distinct resolution, and wherein at least one of the plurality of sub-CNNs is followed by a rectified linear unit (ReLU).

8. The apparatus of claim 7, wherein each of the first set of images having the first dynamic range have a same exposure or different exposures.

9. The apparatus of claim 7, wherein performing the alignment of the set of input images is based on an optical flow algorithm.

10. The apparatus of claim 7, wherein performing the alignment of the set of input images is further based on a plurality of optical flows generated using a corresponding sub-CNN of the plurality of sub-CNNs.

11. The apparatus of claim 7, wherein the processor is further configured to:
generate, using the first CNN with an input comprising the first set of images, a set of estimated images having the second dynamic range; and
minimize an error between a set of ground truth images and the set of estimated images.

12. The apparatus of claim 7, wherein a last of the plurality of sub-CNNs is followed by a linear activation function.

13. A non-transitory computer readable program storage medium having code stored thereon, the code, when executed by a processor, causing the processor to implement a method for visual media processing, the method comprising:
generating a first set of images based on performing an alignment of a set of input images having a first dynamic range, the first set of images having the first dynamic range;
generating a second set of images having a second dynamic range that is greater than the first dynamic range;
aligning the second set of images to generate a third set of images having the second dynamic range; and
generating, using a first convolutional neural network (CNN) and based on at least the third set of images, a final image having the second dynamic range,
wherein the alignment of the set of input images is performed using a plurality of sub-CNNs, wherein each of the plurality of sub-CNNs operates at a distinct resolution, and wherein at least one of the plurality of sub-CNNs is followed by a rectified linear unit (ReLU).

14. The non-transitory computer readable program storage medium of claim 13, wherein performing the alignment of the set of input images is further based on a plurality of optical flows generated using a corresponding sub-CNN of the plurality of sub-CNNs.

15. The non-transitory computer readable program storage medium of claim 14, wherein the method further comprises training the first CNN based on:
generating, using the first CNN with an input comprising the first set of images, a set of estimated images having the second dynamic range; and minimizing an error between a set of ground truth images and the set of estimated images.

16. The non-transitory computer readable program storage medium of claim 13, wherein each of the first set of images having the first dynamic range have a same exposure or different exposures.

17. The non-transitory computer readable program storage medium of claim 13, wherein performing the alignment of the set of input images is based on an optical flow algorithm.

* * * * *